Jan. 13, 1953

O. F. BAUMGARTNER 2,624,966

REINFORCING FRAME AND HOLDER FOR
AUTOMOBILE LICENSE PLATES
Filed July 25, 1949

INVENTOR.
Otto F. Baumgartner
BY
ATTORNEY.

Patented Jan. 13, 1953

2,624,966

UNITED STATES PATENT OFFICE 2,624,966

REINFORCING FRAME AND HOLDER FOR AUTOMOBILE LICENSE PLATES

Otto F. Baumgartner, Kansas City, Mo.

Application July 25, 1949, Serial No. 106,584

1 Claim. (Cl. 40—125)

This invention relates to automobile accessories and more particularly to devices for use with license plates, the primary aim being to provide a holder for such plates that serves the additional purposes of adding attractiveness and more important, supporting and reinforcing the plate to hold the same against bending, warping and other deleterious effects.

It is the most important object of the present invention to provide a license plate holder having a relatively thin, flat panel for underlying the plate throughout its area and provided with a continuous out-turned flange for circumscribing the peripheral edge of the plate, the plate being rigidly fastened to the panel whereby the same is not only outlined distinctively but is held against warping and is protected against other damage.

A further object of the present invention is to provide a license plate holder wherein the aforesaid panel is strengthened by the use of a number of integral ribs of varying thicknesses disposed on the rearmost face thereof.

Other objects of the invention will be made clear or become apparent as the following specification progresses, reference being had to the accompanying drawing, wherein.

Figure 1:
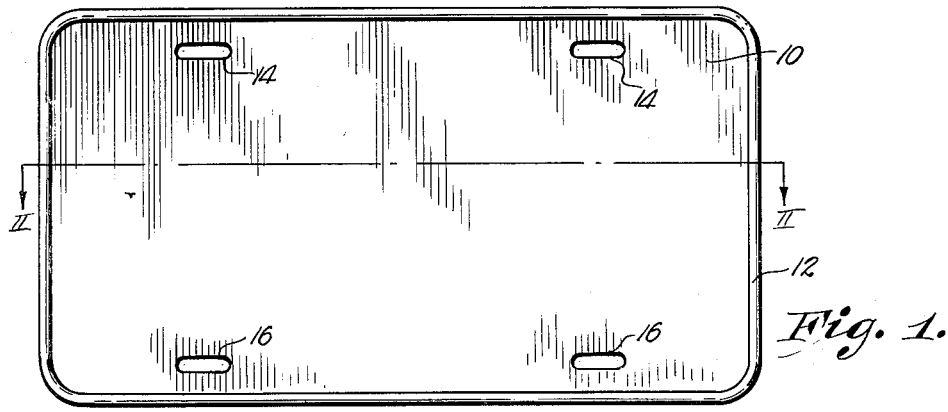
Fig. 1 is a front elevational view of a reinforcing frame and holder for automobile license plates made in accordance with one form of my invention.
Figure 2:
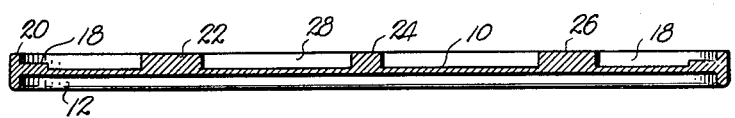
Fig. 2 is a longitudinal, cross-sectional view taken on line II—II of Fig. 1.
Figure 3:
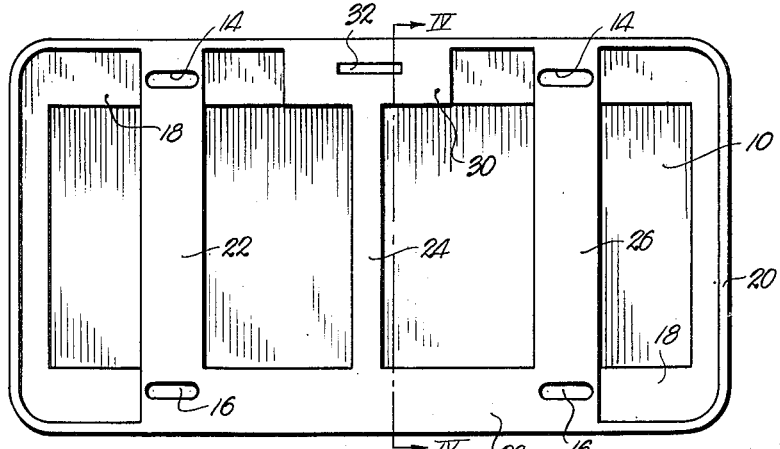
Fig. 3 is a rear elevational view thereof.
Figure 4:
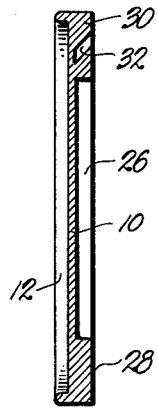
Fig. 4 is a transverse, cross-sectional view taken on line IV—IV of Fig. 3.

In the modification of my invention shown in Figs. 1 to 4 inclusive, there is illustrated a license plate holder and reinforcing structure therefor that includes a polygonal panel broadly designated by the numeral 10 that is relatively thin as shown in Figs. 2 and 4, yet strong and sturdy if made from the proper material.

Inasmuch as the device is used not only to back up the license plate but to hold the same against warping or becoming otherwise misshapened, panel 10 should be made from a strong, metallic substance that will not likely warp or bend when placed in use. Panel 10 is provided with a continuous out-turned flange 12 adjacent the marginal edge of the normally front face thereof that circumscribes the entire peripheral edge of the plate when the latter is disposed on said front face of panel 10 in an operative position.

A pair of elongated slots 14 and a similar pair of elonged slots 16 near the uppermost and lowermost edges respectively of the panel 10 and within the confines of the flange 12, serves as a means for fastening the plate directly to the panel 10. Such fastening means may well be of conventional character and constitute a plurality of short bolts.

It is common knowledge that for the most part, license plates are provided with corresponding slots that will register with the slots 14 and/or 16 to permit such fastening. The rearmost face of the panel 10 shown in Figs. 2, 3 and 4 has cast or otherwise formed integrally therewith, a plurality of reinforcing and strengthening ribs. One of such ribs is continuous and designated by the numeral 18.

Rib 18 is disposed adjacent the marginal edge of the panel 10 and spaced slightly inwardly therefrom. A continuous out-turned flange 20 comprises another of the aforementioned ribs and is contiguous with the periphery of the panel 10.

As shown in Fig. 2, the flange 20 extends beyond the rearwardmost face of panel 10 a distance greater than that of the rib 18. The two longitudinal lengths of the continuous rib 18 are interconnected by a plurality of transverse ribs on the rearmost face of panel 10 designated by the numerals 22, 24 and 26. The ribs 22 and 26 are identical, whereas the rib 24 is somewhat narrower than ribs 22 and 26. One of the longitudinal lengths of the rib 18 has an elongated thickened portion 28 that interconnects the two ribs 22 and 26 and the thickness of the portion 28 is substantially the same as the thickness of the rib 24 as well as the continuous flange 20. A relatively short, thickened portion 30, forms a part of the other or uppermost longitudinal stretch of rib 18. The thickened portion 30 joins in the form of a T with the transverse or vertical rib 24.

It is noted that the two lowermost slots 16 pass through the thickened portion 28 of rib 18 and that the slots 14 are formed in ribs 22 and 24 respectively. The relatively short, thickened portion 30 has an inwardly inclined elongated cavity 32 formed therein. The bolts that fasten the license plate to the panel 10 and that pass through the slots 16 also pass through correspondingly elongated slots forming a part of the bracket that is commonly used on automobiles. As is well known, this bracket is also provided with a hook at the uppermost end thereof and this hook is extended into the inclined cavity 32, all for holding the panel 10 together with the license plate thereon, rigidly in place on the automobile.

It is to be noted that the area of greatest strain, i. e. at the point of mounting upon the automobile bracket, is that portion which is thickened as at 24, 28 and 30. The remainder of the rib 18, the ribs 22 and 26 as well as the outturned flange 20, all additionally cooperate with the aforesaid thickened portions in holding the relatively thin panel 10 rigid and against becoming misshaped either by accident or because of the inherent irregular shape of the plate itself.

In other words, through use of the holder just above described, placing of the license plate within the confines of the flange 12 and upon the panel 10 and fastening the same tightly to panel 10, will remove such irregularities that are common in license plates even when the same are new. The flange 12 will positively protect the relatively thin marginal edges of the plate and since these edges are easily bent through accidental contact therewith, use of a holder as herein described, will prevent the unattractiveness of such mutilated plates. Futhermore, due to the sharpness of the edges of the plates, accidental injury is prevented by use of the continuous flange 12.

It is furthermore apparent that from the standpoint of attractiveness, the rearmost face of the panel 10 is not seen because of the fact that the flange 20 hides from view all of the ribs 18, 22, 24 and 26. It is contemplated that all of the holder that is exposed to view when the license plate is in place, be finished in an attractive manner and to this end a chrome coating is contemplated. To prevent rust and add to the life of the holder, such chrome coating may be placed over the entire device if desired.

Figure 5:
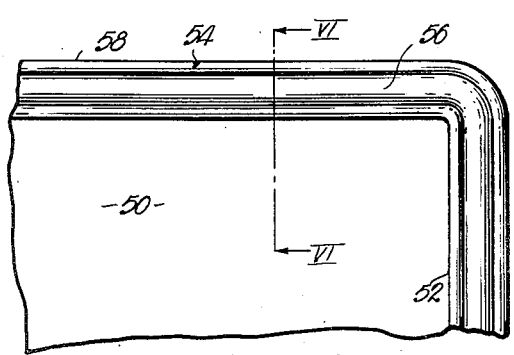
Fig. 5 is a fragmentary, front elevational view of a modified form of my present invention.
Figures 6, 7:
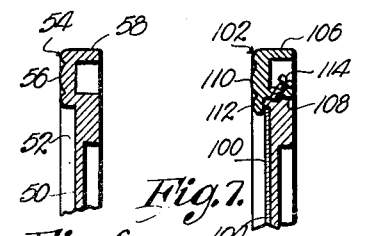
Fig. 6 is a fragmentary, detailed, cross-sectional view taken on line VI—VI of Fig. 5.
Fig. 7 is a fragmentary, detailed, cross-sectional view similar to Fig. 6 showing a still further modified form of my invention.

The modification of my invention shown in Figs. 5 and 6 is essentially the same as that above just described with respect to Figs. 1 to 4 inclusive in that there is provided a flat panel broadly designated by the numeral 50. The rearmost face of the panel 50 has a plurality of ribs formed in much the same manner as just above described and there is also provided a continuous flange 52 that circumscribes the plate when the same is mounted on the panel 50. In lieu of the outturned flange 20 as above set forth, there is provided a continuous L-shaped molding integral with the flange 52. This molding is broadly designated by the numeral 54 and has one decorative leg 56 thereof within a plane common to the outermost free edge of the flange 52. This leg 56 is accordingly substantially parallel with the panel 50. Another leg 58 forming a part of the molding 54, is perpendicular to the leg 56 and to the plane of the panel 50. Leg 58 is spaced from the peripheral edge of panel 50 and terminates in a plane with the thickest of the ribs on the rearmost face of panel 50. As shown in Fig. 6, this leg 58 serves to hide the edge of the holder when viewing the same from the ends or top and thereby adds attractiveness to the entire holder. The attractive appearance of the holder, when viewed from the front, is apparent in Fig. 5.

In the modification of Fig. 7, all of the characteristics described above with respect to the modification of Figs. 1 to 4 inclusive are included, but in lieu of the molding 54 that is formed integral with the panel 50, there is provided a panel 100 having a removable frame-like molding broadly designated by the numeral 102. The panel 100 is provided with a continuous flange 104 for circumscribing the periphery of the plate but this flange 104 has only a width that is substantially the same as the thickness of the plate. The molding 102 is substantially U-shaped in cross-section as shown in Fig. 7, one leg 106 thereof being spaced from the periphery of the panel 100 in the same manner as above described with respect to the leg 54 shown in Fig. 6.

There is provided in the molding 102, a second leg 108 parallel with the leg 106 and disposed in abutting circumscribing relationship to the periphery of the panel 100. The bight 110 of the molding 102 is contoured in any desired manner to present an attractive border. An out-turned flange 112 integral with the molding 102 and adjacent the point of merger between bight 110 and leg 108, extends into overlapping relationship to the flange 104 and to the front marginal edge of the license plate that is mounted upon panel 100. Molding 102 is held in place upon the panel 100 through the medium of a number of inclined screws or the like 114 that pass through the leg 108 and into the peripheral edge of panel 100 as shown in Fig. 7.

It is seen that the inclination of the screws 114 or other fastening means permits moving the same into place without interference by the leg 106. In all of the modifications described, it is apparent that attractiveness is only one of the features of the device of the invention since it is shown that a distinctive appearance can be added, while at the same time providing for strength, rigidty and protection to the license plate itself. Obviously, the entire holder will be made to accommodate the particular plate that is being used and will vary in accordance with the various shapes and sizes thereof. In any event, it is desired that the flange of the holder that circumscribes the plate, be in close juxtaposed relationship to the peripheral edge of the plate, but that sufficient clearance be made to accommodate slight variances in plate size.

The E-shaped rib structure, including ribs 22, 24, 26 and 28 as well as the rib 30, may be used in all forms disclosed and provides rigidity for the plate, for the panel 10, 50 or 100, reinforces the slots 14, 16 and 32, and equally as important, strengthens the supporting bracket itself. The T-shaped edge afforded by rib 18 and flanges 12 and 20 also adds strength to the panel 10.

Manifestly many additional changes and modifications might be made and it is understood that such changes that fall within the scope of this invention as defined by the appended claim, are contemplated hereby.

Having thus described the invention, what is claimed as new and desired to be secured by Letters Patent is:

A combination reinforcing frame and holder for an automobile license plate, said frame and holder comprising a flat polygonal panel; a peripheral flange on the panel extending laterally from one face of the panel and adapted to circumscribe the edge of a license plate when the latter is disposed flatly against said face of the panel; a continuous marginal band integral with the opposite face of the panel, certain lengths of said band being of increased thickness; a plurality of spaced-apart, parallel ribs integral with said opposite face of the panel and integrally joining said lengths; and means for attaching a license plate to said one face of the panel and including a continuous molding having a pair of spaced legs and a bight provided with a decorative face disposed to present a border for said one face of the panel, one of the legs being in circumscribing engagement with said flange and said band of the panel, a flange on the molding in overlapping engagement with one marginal edge of the plate, and a plurality of screws in said one leg and extending into said band.

OTTO F. BAUMGARTNER.

REFERENCES CITED

The following references are of record in the file of this patent:

UNITED STATES PATENTS

| Number | Name | Date |
| --- | --- | --- |
| 1,561,420 | Elliott | Nov. 10, 1925 |
| 1,573,113 | Irie | Feb. 16, 1926 |
| 1,587,952 | Hartman | June 8, 1926 |
| 1,630,658 | Davis | May 31, 1927 |
| 1,758,627 | Sweitzer | May 13, 1930 |
| 1,886,352 | Nickerson | Nov. 1, 1932 |
| 2,192,561 | Seeley | Mar. 4, 1940 |